United States Patent
Sah et al.

(10) Patent No.: US 8,560,191 B2
(45) Date of Patent: Oct. 15, 2013

(54) METHOD AND APPARATUS TO CONTROL CLUTCH PRESSURES IN AN ELECTRO-MECHANICAL TRANSMISSION

(75) Inventors: Jy-Jen F. Sah, West Bloomfield, MI (US); Ali K Naqvi, White Lake, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 856 days.

(21) Appl. No.: 12/247,293

(22) Filed: Oct. 8, 2008

(65) Prior Publication Data

US 2009/0112429 A1   Apr. 30, 2009

Related U.S. Application Data

(60) Provisional application No. 60/982,772, filed on Oct. 26, 2007.

(51) Int. Cl.
*G06F 19/00* (2011.01)
*F16D 13/75* (2006.01)

(52) U.S. Cl.
USPC ............................................. 701/58; 701/68

(58) Field of Classification Search
USPC .............. 701/58, 67, 68; 192/103 A, 105 CP, 192/103 F, 0.052, 0.033, 0.076, 111, 70.25, 192/74, 111.1, 66.1, 70.251, 111.15; 477/77, 83, 111; 74/336 R, 89
See application file for complete search history.

(56) References Cited

U.S. PATENT DOCUMENTS

| | | | |
|---|---|---|---|
| 4,509,625 A * | 4/1985 | Tellert | 477/86 |
| 6,022,293 A | 2/2000 | Dourra et al. | |
| 6,050,379 A * | 4/2000 | Lyon | 192/54.1 |
| 6,220,109 B1 * | 4/2001 | Fischer et al. | 74/337.5 |
| 6,364,809 B1 * | 4/2002 | Cherry | 477/86 |
| 6,412,617 B1 * | 7/2002 | Spijker et al. | 192/3.55 |
| 6,463,821 B1 * | 10/2002 | Reed, Jr. et al. | 74/330 |
| 6,832,148 B1 | 12/2004 | Bennett | |
| 6,868,318 B1 | 3/2005 | Cawthorne | |
| 7,154,236 B1 | 12/2006 | Heap | |
| 7,156,217 B2 * | 1/2007 | Raber | 192/84.6 |
| 2002/0072447 A1 * | 6/2002 | Genise | 477/77 |
| 2002/0134642 A1 * | 9/2002 | Genise | 192/105 C |
| 2002/0137595 A1 * | 9/2002 | Markyvech et al. | 477/77 |
| 2003/0106767 A1 * | 6/2003 | Beneton et al. | 192/111 A |
| 2004/0005956 A1 | 1/2004 | You | |
| 2004/0104096 A1 * | 6/2004 | Genise | 192/105 CP |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |

(Continued)

*Primary Examiner* — Ronnie Mancho (57) ABSTRACT

A method for reducing occurrence of clutch slip in electro-mechanical transmission adapted to selectively transmit mechanical power to an output member through selective application of a hydraulically actuated clutch includes monitoring operation of said clutch, identifying an indication of clutch wear based upon said monitoring said operation, and increasing a minimum clamping force applied to said clutch based upon said indication of clutch wear.

7 Claims, 6 Drawing Sheets

(56) References Cited

U.S. PATENT DOCUMENTS

| | | |
|---|---|---|
| 2005/0080539 A1 | 4/2005 | Hubbard |
| 2005/0080540 A1 | 4/2005 | Steinmetz |
| 2005/0080541 A1 | 4/2005 | Sah |
| 2005/0107213 A1 | 5/2005 | Kim et al. |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh et al. |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0099300 A1* | 5/2008 | Youngwerth et al. ..... 192/103 A |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |

(56) References Cited

U.S. PATENT DOCUMENTS

| | | |
|---|---|---|
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

\* cited by examiner

FIG. 9

METHOD AND APPARATUS TO CONTROL CLUTCH PRESSURES IN AN ELECTRO-MECHANICAL TRANSMISSION

CROSS REFERENCE TO RELATED APPLICATIONS

This application claims the benefit of U.S. Provisional Application No. 60/982,772 filed on Oct. 26, 2007 which is hereby incorporated herein by reference.

TECHNICAL FIELD

This disclosure pertains to control systems for electromechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid drive vehicle require management of numerous torque bearing shafts or devices representing connections to the above mentioned engine, electrical motors, and driveline. Various control schemes and operational connections between the various aforementioned components of the hybrid drive system are known, and the control system must be able to engage and disengage the various components in order to perform the functions of the hybrid drive system. Engagement and disengagement is known to be accomplished through the use of a transmission employing clutches. Clutches are devices well known in the art for engaging and disengaging shafts including the management of rotational velocity and torque differences between the shafts. Engagement or locking, disengagement or unlocking, operation while engaged or locked operation, and operation while disengaged or unlocked operation are all clutch states that must be managed in order for the vehicle to operate properly and smoothly.

Implications to vehicle operation related to perceptible jerks or abrupt changes to vehicle acceleration are collectively described as drivability. One source of perceptible jerks affecting drivability is slip, or relative rotational movement between the connective surfaces of a clutch. Slip occurs whenever the reactive torque transmitted through the clutch exceeds the actual torque capacity. Clutches can be designed to operate with some level of controlled slip in asynchronous operation, or clutches can be designed to operate with little or preferably no slip in synchronous operation. This disclosure deals with clutches designed primarily for synchronous operation. Slip in a transmission in synchronous operation results in unintended loss of control within the transmission and adverse effects upon drivability.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. In an exemplary hydraulically actuated clutch, capacity of the clutch to transfer reactive torque is created by the applied clamping force compressing and creating friction force between the clutch connective surfaces. Applied clamping force is reacted by hydraulic pressure acting within an actuation device, such as a piston driven cylinder, translating pressure through the piston into a force. Operated thusly, the clutch is not operated in a binary manner, but rather is capable of a range of engagement states, from fully disengaged and desynchronized, to synchronized with no clamping force applied, to engaged but with only minimal clamping force, to engaged with some maximum clamping force. This variable control of clutches allows for smooth transition between locked and unlocked states and also allows for managing slip in a locked transmission.

The capacity of the clutch to transmit reactive torque is a function of the magnitude of the clamping force applied to the clutch and the coefficients of friction between the connective surfaces being applied. Coefficients of friction between two surfaces are known in the art to include a static coefficient of friction and a kinetic coefficient of friction. Through the life of a clutch, wear causes gradual degradation of the clutch torque capacity for a given clamping force. As a result, a clutch pressure originally sufficient to create a particular torque capacity within the clutch can eventually fail to create the same torque capacity.

A method to operate a powertrain comprising modulating clutch clamping force based upon clutch slip would be beneficial to adjust for degradation in clutch torque capacity.

SUMMARY

A method for reducing occurrence of clutch slip in electromechanical transmission adapted to selectively transmit mechanical power to an output member through selective application of a hydraulically actuated clutch includes monitoring operation of said clutch, identifying an indication of clutch wear based upon said monitoring said operation, and increasing a minimum clamping force applied to said clutch based upon said indication of clutch wear.

BRIEF DESCRIPTION OF THE DRAWINGS

One or more embodiments will now be described, by way of example, with reference to the accompanying drawings, in which.

DETAILED DESCRIPTION

Figure 1:
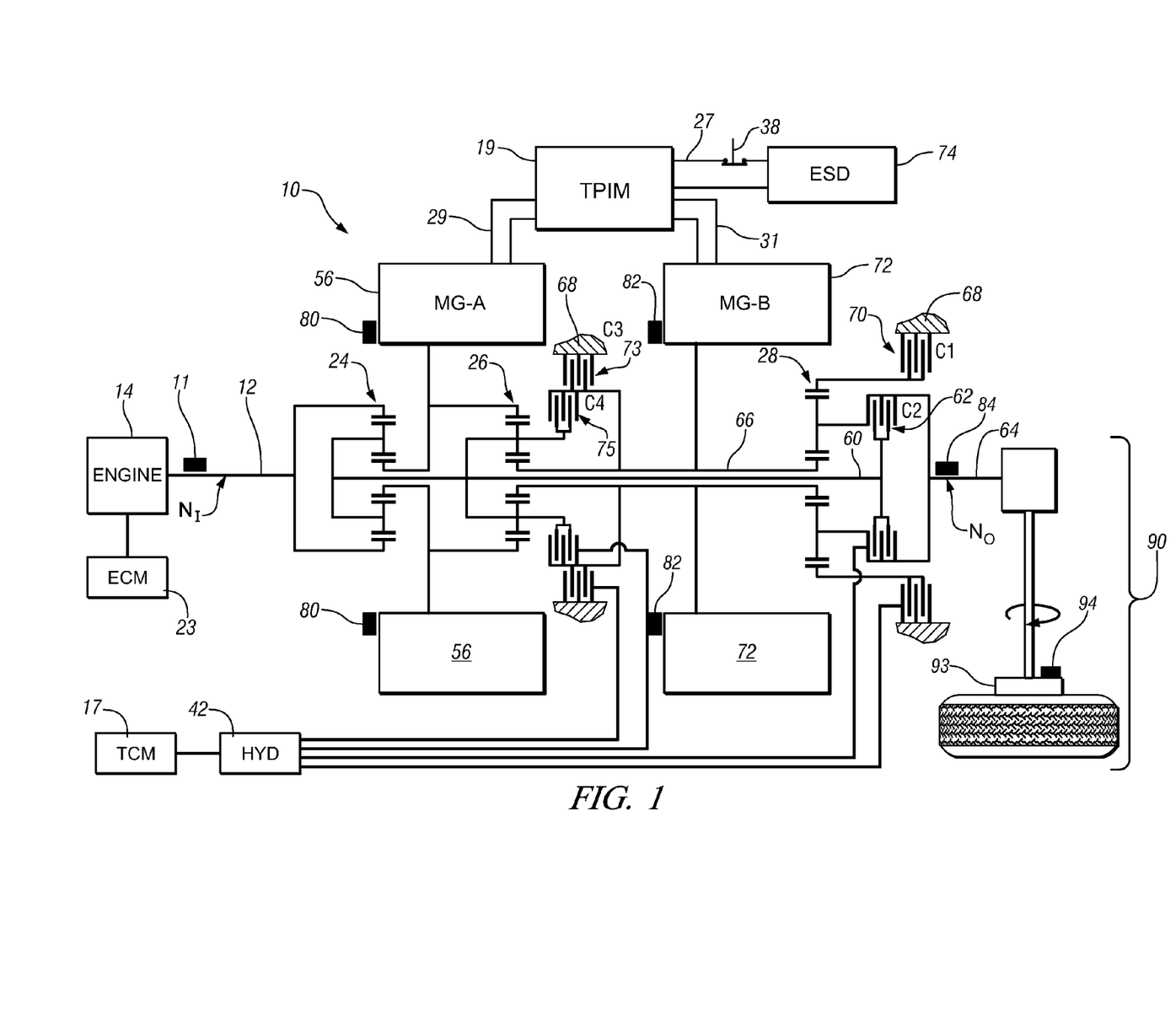
FIG. 1 is a schematic diagram of an exemplary powertrain, in accordance with the present disclosure.
Figure 2:
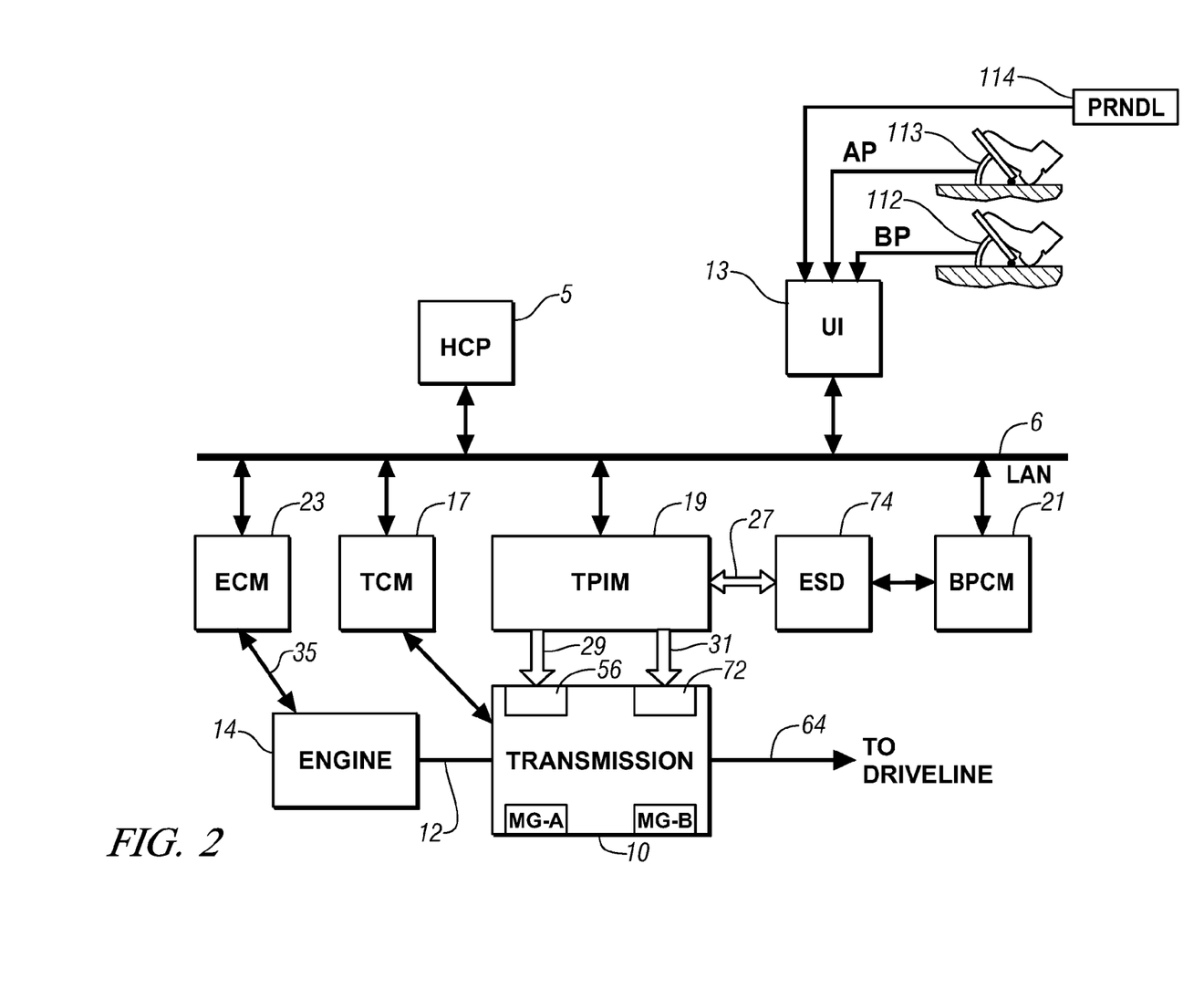
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved.

A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

Clutch torque capacity is a function of the clamping force applied to the clutch and the relevant coefficient of friction for the connective surfaces of the clutch. When the clutch connective surfaces are synchronized and locked, meaning that the connective surfaces are in contact and moving with zero relative angular velocity, a static coefficient of friction describes the clutch torque capacity resulting from the clamping force. When the clutch connective surfaces are not locked and the clutch is slipping, a kinetic coefficient of friction, lower than the static coefficient of friction, describes the torque between the connective surfaces resisting the slip. If this torque resisting the slip is greater than the torque being transmitted through the clutch, then slip speed will reduce. If the torque resisting the slip is less than the torque being transmitted through the clutch, then the slip speed will increase. Therefore, a method to recover a locked state in a slipping clutch is to increase clamping force to increase torque resisting the slip. Many methods in control logic are envisioned to boost clamping force. One exemplary method to accomplish this boost is to sum a pressure required to meet a clutch reactive torque requirement ($P_{CL\_REQ}$) and an offset pressure ($P_{OFFSET}$) calibrated to control the slip. Methods described herein discuss adjustments to hydraulic line pressure in terms of adjustments to $P_{OFFSET}$ for convenience. However, it will be appreciated that $P_{OFFSET}$ is simply an efficient means to discuss adjusting a minimum hydraulic line pressure taking clutch reactive torque into account. In broader terms, the disclosure could equivalently discuss maintaining a minimum hydraulic line pressure in the context of adjustments to $P_{CL\_REQ}$ instead of increasing $P_{OFFSET}$, but $P_{OFFSET}$, as an exemplary embodiment, provides a clear illustration of utilization of incremental increases.

Figure 3:
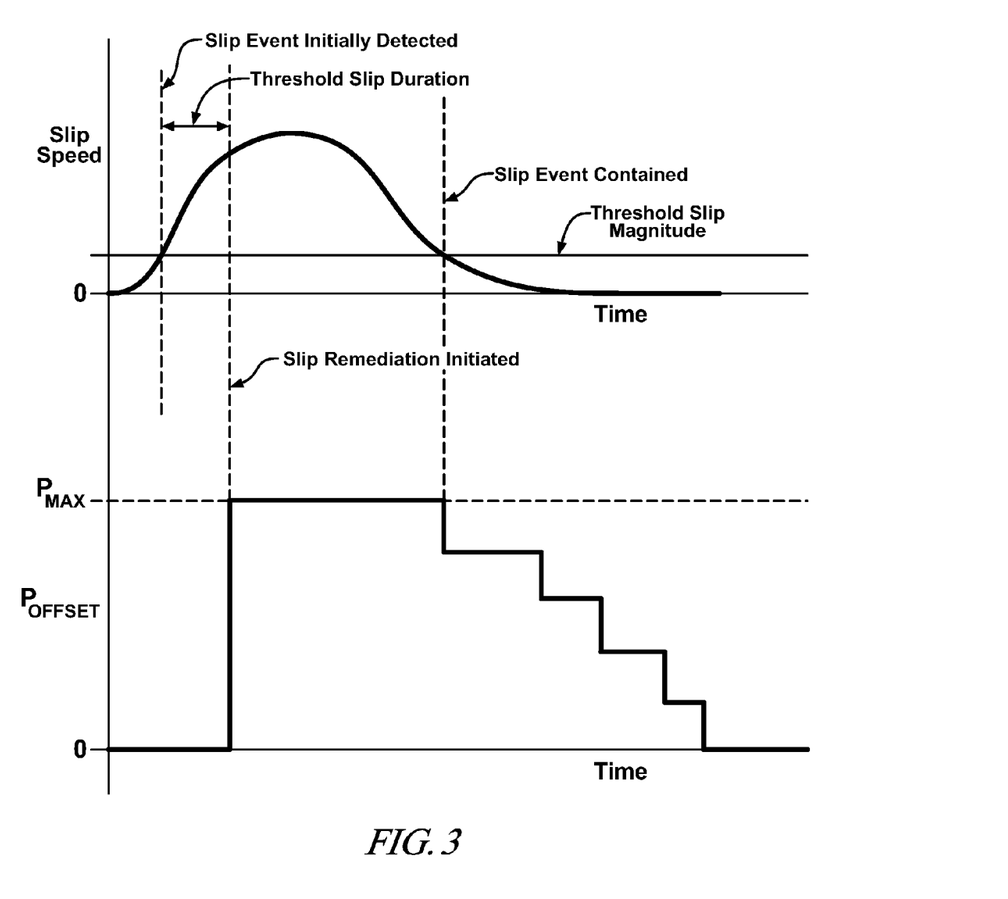
FIG. 3 is a graphical representation of an exemplary slip event and corresponding clutch slip recovery event, in accordance with the present disclosure.

FIG. 3 is a graphical representation of an exemplary slip event and corresponding clutch slip recovery event in accordance with the present disclosure. Two graphs are depicted sharing a common timescale. The top portion of the graph depicts slip speed or the relative angular velocity between connective surfaces of a clutch. Some embodiments of synchronous clutches can sustain low levels of slip or brief occurrences of slip without significant degradation to performance or risk of damage. A method is depicted to classify a significant slip event as an occurrence of slip above some threshold slip magnitude for more than a threshold duration of time. Slip initially increases from zero in excess of the threshold slip magnitude. If slip reduces below the threshold quickly, in a time less than the threshold slip duration, then the slip event can be disregarded as not significant. However, if slip in excess of the threshold slip magnitude is detected for longer than the threshold slip duration, then the slip event can be classified as significant, and a slip remediation action can be initiated. As described above, an increase in clamping force applied to the clutch connective surfaces increases the torque within the clutch resisting slip. $P_{OFFSET}$ as an exemplary method to control an increase in clamping force is depicted in the bottom portion of the graph.

Hydraulic line pressure is effected by a hydraulic pump. One known configuration of a powertrain includes a main hydraulic pump mechanically driven by an engine, wherein engine rotation directly drives the hydraulic pump and supplies hydraulic pressure to the hydraulic control system. In hybrid powertrain applications or application utilizing an engine start/stop strategy, deactivation or idling of the engine can reduce or remove hydraulic pressure available from the main hydraulic pump. An auxiliary hydraulic pump is known to be used, utilizing for example an electric motor, to provide alternative or additional hydraulic pressure. In particular in association with an auxiliary pump, hydraulic pressure is managed, where the auxiliary pump is not operated at full capacity when the maximum hydraulic pressure is not needed. However, in association with a perceived demand for a maximum available hydraulic line pressure ($P_{MAX}$) the auxiliary pump can be controlled to provide additional pressure. Control of the auxiliary hydraulic pump is known to be accomplished through an auxiliary hydraulic pump control module processing inputs and issuing auxiliary pump speed commands. Hydraulic pressure can additionally be managed in relation to a main hydraulic pump or an auxiliary hydraulic pump by managing consumption of hydraulic flow in functions consuming pressurized hydraulic fluid.

Returning to FIG. 3, $P_{OFFSET}$ describes an increase to commanded hydraulic line pressure in order to remediate the detected slip event. Upon initiation of slip remediation, $P_{OFFSET}$ is commanded to $P_{MAX}$ in order to provide the most rapid and effective means to control slip possible. Once slip speed is reduced below the threshold slip magnitude, $P_{OFFSET}$ can be reduced below $P_{MAX}$ and restored to a normal level. Restoration of $P_{OFFSET}$ can be accomplished in a step pattern, immediately restoring $P_{OFFSET}$ to zero. However, in order to avoid reoccurrence of slip, a method stepping down $P_{OFFSET}$ incrementally has been shown to be beneficial. The number of increments, the incremental decreases in $P_{OFFSET}$, and the hold times for each incremental decrease before the next decrease may be developed experimentally, empirically, predictively, through modeling or other techniques adequate to accurately predict clutch and hydraulic control system operation, and a multitude of $P_{OFFSET}$ reduction strategies might be used by the same powertrain for different clutches and for different conditions or operating ranges. The threshold slip magnitude and the threshold slip duration as described in the above method can be a simple value or may be variable depending upon vehicle conditions. These values can be developed experimentally, empirically, predictively, through modeling or other techniques adequate to accurately predict clutch operation.

Figure 4:
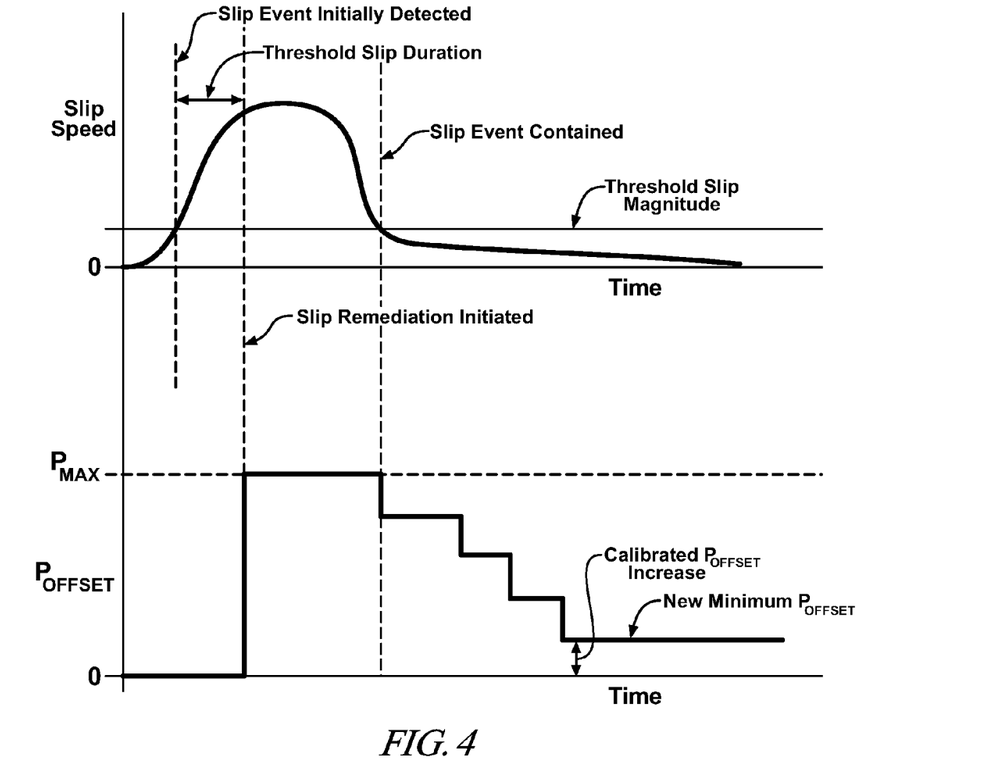
FIG. 4 is a graphical representation of a slip event and a corresponding clutch slip recovery event, including a method to gradually, incrementally increase $P_{OFFSET}$ in order to adjust clutch torque capacity, in accordance with the present disclosure.

The method described in FIG. 3 remediates significant slip events by increasing clamping force through a slip event. However, each slip event is treated in isolation, and no action is taken to account for changing behavior in the clutch. As described above, wear in a clutch tends to increase the clamping force required to achieve a given clutch torque capacity. FIG. 4 is a graphical representation of a slip event and a corresponding clutch slip recovery event, including a method to gradually, incrementally increase $P_{OFFSET}$ in order to adjust clutch torque capacity, in accordance with the present disclosure. Similarly to FIG. 3, FIG. 4 includes a graph on a top portion depicting slip speed and, on a common timescale, a graph on a bottom portion depicting $P_{OFFSET}$ as an exemplary method to control a slip remediation event. As described above, in the event that slip in excess of a threshold slip magnitude is detected for longer than a threshold slip duration, slip remediation is initiated, wherein $P_{OFFSET}$ is increased to $P_{MAX}$. Once slip speed is reduced below the threshold slip magnitude, $P_{OFFSET}$ is reduced in increments as described in FIG. 3. However, instead of returning to the initial $P_{OFFSET}$ level, zero in the exemplary data, $P_{OFFSET}$ is reduced to some increased minimum $P_{OFFSET}$. This increased $P_{OFFSET}$ creates an incrementally increased clamping force upon the clutch. By increasing the clamping force upon the clutch, the clutch can exert an increased clutch torque capacity than was exerted before the minimum $P_{OFFSET}$ was increased. This incremental increase in clutch torque capacity in response to a slip event serves to offset gradual degradation in the clutch.

Other methods to increase $P_{OFFSET}$ or otherwise increase applied force to a clutch are envisioned. For example, a lookup table or a time or usage based clutch wear estimate function can be utilized to gradually implement an increased clamping force to compensate for clutch wear. However, lookup tables and functional estimates are prone to error. Such error can lead to unnecessarily high hydraulic line pressures, creating inefficient requirements upon the auxiliary hydraulic pump. An adjustment to clamping force based upon a feedback signal such as a slip event indication provides for necessary increases to clamping force based upon an indication that clutch torque capacity has been reduced below expected levels for a given clamping force. Other methods to control increases to clamping force envisioned include applying statistical analysis to a set of slip events in order to evaluate and predict a clutch wear rate. Such a predicted clutch wear rate, if determined to meet some minimum level of confidence, can be used to anticipatorily increase clamping force through the life of the clutch. Additionally, it will be appreciated by one having ordinary skill in the art that clutch slip in the above described method is being used as a means to evaluate wear on the clutch. Any method to evaluate wear on the clutch, for example, running the clutch in a test mode upon vehicle start-up, with an asynchronous spin, touching connective surfaces clutch state evaluation of the clutch, a clutch wear health estimate could be used in place of the significant clutch slip event indicated above. The disclosure envisions many methods to evaluate wear upon the clutch and is not intended to be limited to the specific exemplary embodiments described herein.

Figure 5:
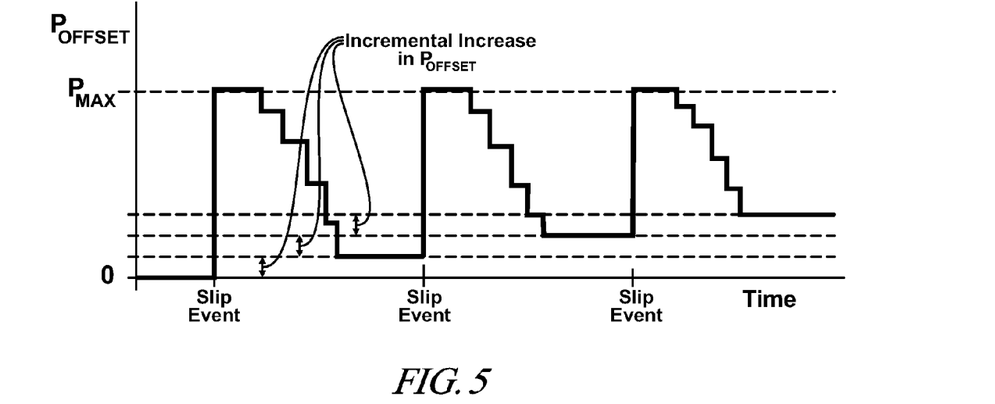
FIG. 5 graphically depicts incremental increases to minimum $P_{OFFSET}$ over a number of slip events, in accordance with the present disclosure.

FIG. 5 graphically depicts incremental increases to minimum $P_{OFFSET}$ over a number of slip events, in accordance with the present disclosure. $P_{OFFSET}$ is depicted through a number of slip events, each slip event initiating a corresponding slip remediation. With each remediation, as described above, $P_{OFFSET}$ returns to an incrementally increased minimum value. The magnitude of each incremental increase in minimum $P_{OFFSET}$ can be a set increment, can be based upon a logarithmic or scaled function, or the magnitude can change according to some monitored variable such as the magnitude of the subject slip event or the maintenance status of the clutch.

Figure 6:
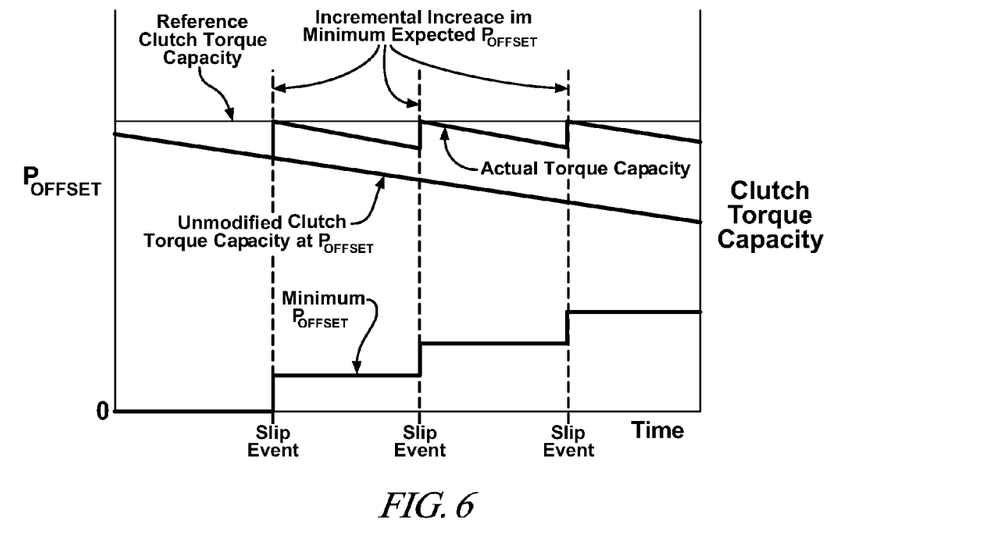
FIG. 6 graphically illustrates a series of incremental increases in minimum $P_{OFFSET}$ over a number of slip events and corresponding exemplary clutch torque capacity data, in accordance with the present disclosure.

FIG. 6 graphically illustrates a series of incremental increases in minimum $P_{OFFSET}$ over a number of slip events and corresponding exemplary clutch torque capacity data, in accordance with the present disclosure. Minimum $P_{OFFSET}$ depicts increases to a minimum $P_{OFFSET}$ term as described above. Clutch torque capacity results from a line pressure applying a clamping force to clutch connective surfaces, as described above. Without factoring resulting clutch torque capacity for wear, clutch torque capacity can be expressed as a function of line pressure applied to the clutch. In order to account for wear, a modification to the function relating clutch pressure to clutch torque capacity can be programmed, including a modulation factor such as $P_{OFFSET}$ to account for the effects of wear. However, retaining the calculation of clutch torque capacity as a simple equation based upon line pressure applied to the clutch is beneficial due to resulting simplified calculations. Clutch torque capacity is used in many modules and calculations throughout the powertrain, and simplified calculation of clutch torque capacity benefits each of these downstream uses. A preferred method is disclosed wherein line pressure to the clutch is modulated by the $P_{OFFSET}$ term, and clutch torque capacity calculations assume zero wear upon the clutch connective surfaces. In FIG. 6, a reference clutch torque capacity is depicted, demonstrating a clutch torque capacity that can be estimated for a given line pressure applied to a clutch. An unmodified clutch torque capacity is depicted illustrating exemplary behavior of a clutch for the given line pressure and experiencing normal wear through the life of the clutch wherein no increase to minimum $P_{OFFSET}$ is utilized. As described above, wear gradually reduces clutch torque capacity resulting from application of a particular clamping force resulting from the line pressure. Because, in the exemplary data, no offset is utilized to increase clamping force, the unmodified clutch torque capacity for a given reactive torque input decreases over time. An incrementally increased clutch torque capacity is depicted, illustrating periodic increases to clutch torque capacity for a given reactive torque input, corresponding to increases in $P_{OFFSET}$. While wear continues to degrade the ability of the clutch to transmit reactive torque through the life of the clutch, as depicted by the general downward trend in the data, increases to $P_{OFFSET}$ sustains clutch torque capacity for a given input.

Figure 7:
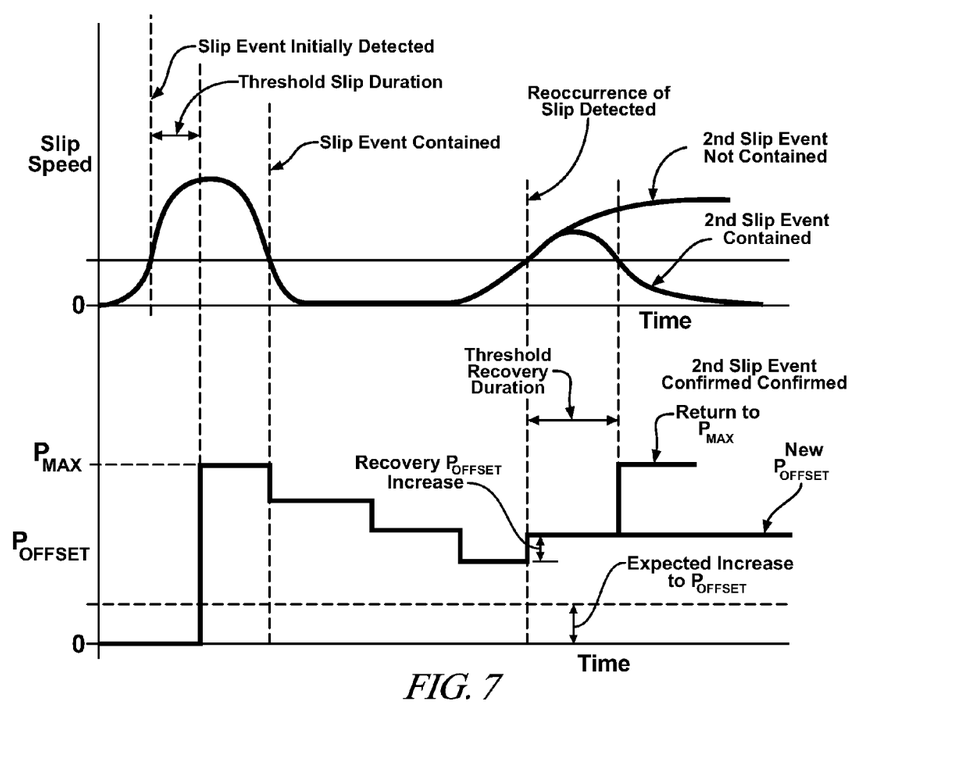
FIG. 7 is a graphical representation of a slip event and a corresponding clutch slip recovery event, including a method to set $P_{OFFSET}$ in response to a reoccurrence of slip, in accordance with the present disclosure.

The method above describes a remediation response to a slip event, including a boost of $P_{OFFSET}$ to a $P_{MAX}$ and then a gradual reduction in $P_{OFFSET}$ to an increase minimum $P_{OFFSET}$ after the slip event has been contained. However, selection of the incremental increase in minimum $P_{OFFSET}$, depending upon how small the increment is, can fail to resist slip proximately in time to the remediation event. FIG. 7 is a graphical representation of a slip event and a corresponding clutch slip recovery event, including a method to set $P_{OFFSET}$ in response to a reoccurrence of slip, in accordance with the present disclosure. As described above, a significant slip event is detected and a remediation event is initiated. After the slip event is initially contained, $P_{OFFSET}$ is reduced in increments toward a predetermined incrementally increased minimum $P_{OFFSET}$ expected to subsequently deter slip in the foreseeable future. However, before the new $P_{OFFSET}$ is reached in accordance with the expected increase, slip in excess of the threshold slip magnitude occurs. A number of reactions, comprising a slip reoccurrence recovery cycle, are contemplated in response to reoccurrence of slip. One exemplary method is to return $P_{OFFSET}$ immediately to $P_{MAX}$ and treat the new slip as a new slip event. In another exemplary method to react to the reoccurrence of slip, $P_{OFFSET}$ at the level where slip occurred is boosted by a recovery $P_{OFFSET}$ increase. Slip is monitored through a threshold recovery duration to evaluate whether the recovery $P_{OFFSET}$ increase is effective to contain the second slip event. Two curves are depicted in FIG. 7, one wherein the second slip event is contained and another wherein the second slip event is not contained in the threshold recovery duration. In a case wherein after the threshold recovery duration, slip is reduced to or below the threshold slip magnitude, the recovery $P_{OFFSET}$ increase can be determined to have remediated the second slip event. In this case, the new minimum $P_{OFFSET}$ can be set to the level set by the recovery $P_{OFFSET}$ increase. In a case wherein after the threshold recovery duration, slip is not reduced to or below the threshold slip magnitude, the recovery $P_{OFFSET}$ increase can be determined to have not remediated the second slip event. In this case, the second slip event can be treated as a new case, $P_{OFFSET}$ can be increased to $P_{MAX}$, and methods described herein, such as the method described in relation to FIG. 4, can be employed to remediate the slip event. A new $P_{OFFSET}$ term can subsequently be selected in excess of the level indicated by the recovery $P_{OFFSET}$ increase that failed to recover the second slip event.

Figure 8:
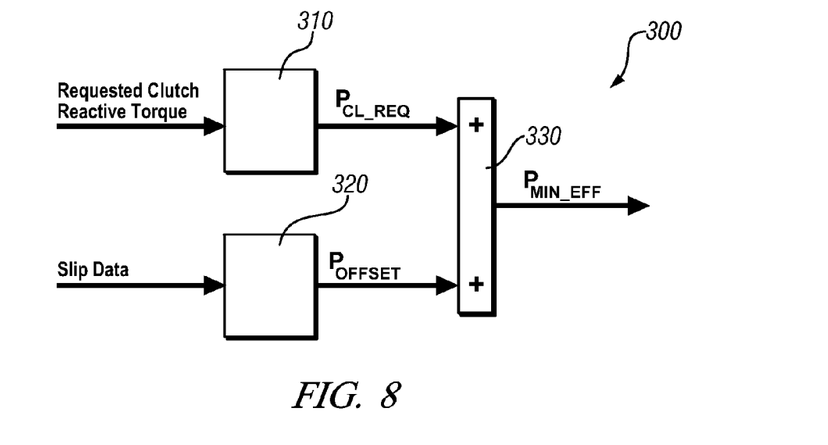
FIG. 8 schematically illustrates an exemplary process to calculate and combine clutch pressure requirements, incorporating a pressure required to meet clutch reactive torque requirements and $P_{OFFSET}$, in accordance with the present disclosure.

FIG. 8 schematically illustrates an exemplary process to calculate and combine clutch pressure requirements, incorporating a pressure required to meet clutch reactive torque requirements and $P_{OFFSET}$, in accordance with the present disclosure. Process 300 comprises clutch reactive torque pressure module 310, offset pressure module 320, and summation block 330. As described above, powertrain control mechanisms, am HCP for example, determine how much torque is to be applied to each clutch in the powertrain. Clutch reactive torque pressure module 310 inputs requested clutch reactive torque and applies programming, including factors based upon clutch specifications, to determine clutch pressure required to achieve a clutch torque capacity capable of transmitting the requested clutch reactive torque. Clutch reactive torque pressure module 310 outputs $P_{CL\_REQ}$. Offset pressure module 320 inputs clutch slip data in accordance with methods disclosed herein and outputs $P_{OFFSET}$. Summation block 330 sums $P_{CL\_REQ}$ and $P_{OFFSET}$ and outputs a minimum effective pressure ($P_{MIN\_EFF}$) required to satisfy the required clutch torque capacity to transmit the request clutch reactive torque and compensate the clutch torque capacity for clutch capacity due to clutch degradation.

Figure 9:
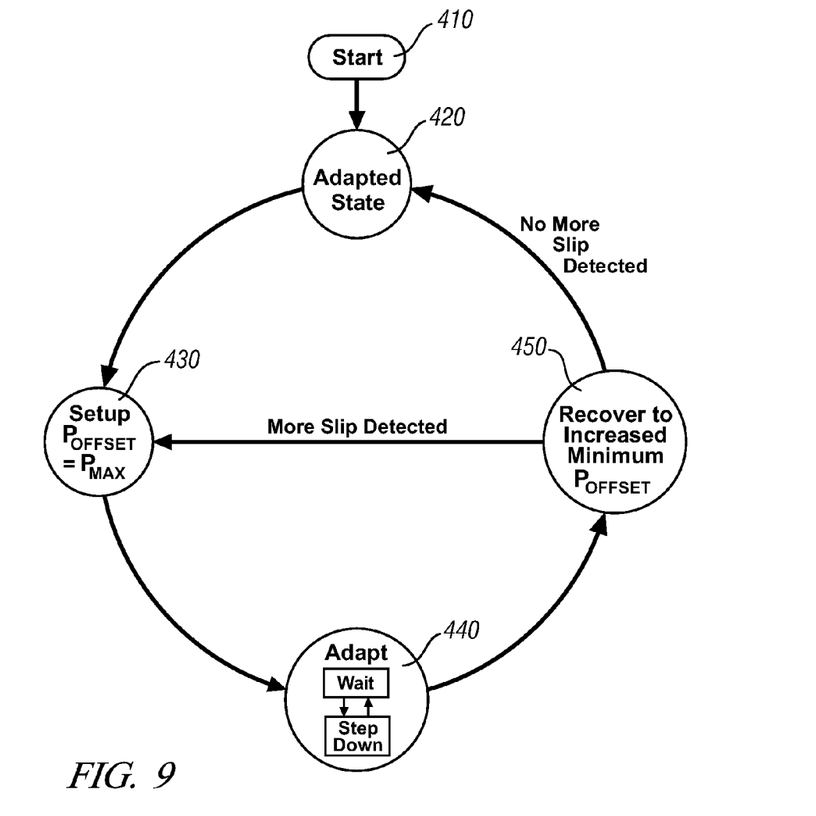
FIG. 9 depicts an exemplary process flow, wherein a pressure offset term is managed in a cycle, in accordance with the present disclosure.

FIG. 9 depicts an exemplary process flow, wherein a pressure offset term is managed in a cycle, in accordance with the present disclosure. Exemplary process 400 starts at step 410 and proceeds initially to an adapted state at step 420. The process waits at step 420 until a significant slip event is detected. Upon detection of a significant slip event, the process proceeds to step 430 wherein $P_{OFFSET}$ is stepped up to $P_{MAX}$ in accordance with methods described herein in order to contain the slip event. At step 440, after the slip event has been contained, the process adapts $P_{OFFSET}$ through a series of wait and step down actions, gradually decreasing $P_{OFFSET}$. If no reoccurrence of slip is detected through step 440, then in step 450 a new minimum $P_{OFFSET}$ is defined based on methods described herein, and the process reiterates to step 420. If a reoccurrence of slip is detected in step 440, then the process reiterates to step 430, wherein $P_{OFFSET}$ is increased to $P_{MAX}$ and the containment process is restarted.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for reducing occurrence of clutch slip in electro-mechanical transmission adapted to selectively transmit mechanical power to an output member through selective application of a hydraulically actuated clutch, wherein a control module performs the following steps, said method comprising:
monitoring a slip speed of said hydraulically actuated clutch;
identifying a significant clutch slip event based upon said monitored slip speed exceeding a threshold slip magnitude; and
increasing a minimum clamping force applied to said clutch by controlling a hydraulic line pressure based upon said identified significant clutch slip event, wherein controlling said hydraulic line pressure comprises maintaining an increased minimum hydraulic line pressure, and further
when said significant clutch slip event is identified, initiating a remediation event comprising:
increasing said hydraulic line pressure to a maximum pressure, and when said slip speed is less than a threshold slip magnitude, decreasing said hydraulic line pressure to said increased minimum hydraulic line pressure, wherein decreasing said hydraulic line pressure comprises utilizing a series of incrementally stepped down reductions in said hydraulic line pressure, and
if said slip speed exceeds said threshold slip magnitude during said decreasing said hydraulic line pressure initiating a slip reoccurrence recovery cycle comprising:
increasing said hydraulic line pressure by a recovery increase;
monitoring slip speed through a threshold recovery duration after said incrementally increasing said hydraulic line pressure;

if said monitoring slip speed indicates that said slip speed is reduced to less than said threshold slip magnitude by the end of said threshold recovery duration, maintaining said hydraulic line pressure to at least a level set by said recovery increase; and
if said monitoring slip speed indicates that said slip speed is not reduced to less than said threshold slip magnitude by the end of said threshold recovery duration, reinitiating said remediation event,
wherein increasing said clamping force increases a torque resisting the clutch slip.

2. The method of claim 1, wherein identifying said significant clutch slip event comprises:
identifying said significant clutch slip event based upon said slip speed remaining in excess of said threshold slip magnitude throughout a threshold slip duration.

3. The method of claim 1, wherein maintaining said increased minimum hydraulic line pressure comprises increasing a minimum offset hydraulic line pressure by an incremental increase.

4. Method for controlling hydraulic line pressure in electro-mechanical transmission adapted to selectively transmit mechanical power to an output member through selective application of a hydraulically actuated clutch, wherein a control module performs the following steps, the method comprising:
monitoring slip speed in said hydraulically actuated clutch;
identifying a significant clutch slip event based upon said monitoring said slip speed exceeding a threshold slip magnitude; and
maintaining an increased minimum offset hydraulic line pressure based upon said identifying said significant clutch slip event,
wherein maintaining the increased minimum offset hydraulic line pressure increases a torque resisting clutch slip,
wherein when said significant clutch slip event is identified initiating a remediation event comprising:
increasing an offset hydraulic line pressure to a maximum pressure, and when said slip speed is less than a threshold slip magnitude, decreasing said offset hydraulic line pressure to said increased minimum hydraulic line pressure utilizing a series of incrementally stepped down reductions in said offset hydraulic line pressure, and
if said slip speed exceeds said threshold slip magnitude during said decreasing of said offset hydraulic line pressure reinitiating said remediation event.

5. The method of claim 4, wherein identifying said significant clutch slip event comprises:
identifying said clutch slip event as significant if said slip speed remains in excess of said threshold slip magnitude throughout a threshold slip duration.

6. The method of claim 4, wherein maintaining said increased minimum offset hydraulic line pressure includes a fixed incremental increase.

7. The method of claim 4, wherein maintaining said increased minimum offset hydraulic line pressure includes an increase scaled to a magnitude of said significant clutch slip event.

* * * * *